(12) United States Patent
Vilhonen et al.

(10) Patent No.: US 7,027,783 B2
(45) Date of Patent: Apr. 11, 2006

(54) METHOD AND APPARATUS PROVIDING REDUCTION IN TRANSMITTER CURRENT CONSUMPTION USING SIGNAL DERIVED FROM RECTIFIED INPUT SIGNAL

(76) Inventors: Sami Vilhonen, Ritavuorenkuja 1 F 27, FIN-20540 Turku (FI); Sami Vaara, Vienankatu 3 B 5, FIN-20750 Turku (FI)

( * ) Notice: Subject to any disclaimer, the term of this patent is extended or adjusted under 35 U.S.C. 154(b) by 453 days.

(21) Appl. No.: 10/372,685

(22) Filed: Feb. 24, 2003

(65) Prior Publication Data

US 2004/0176052 A1  Sep. 9, 2004

(51) Int. Cl.
*H04B 1/04* (2006.01)
*H01Q 11/12* (2006.01)

(52) U.S. Cl. .................... 455/118; 327/113
(58) Field of Classification Search ............. 455/127.1, 455/118, 323, 333, 313; 327/113
See application file for complete search history.

(56) References Cited

U.S. PATENT DOCUMENTS

| | | | | |
|---|---|---|---|---|
| 5,548,616 | A | 8/1996 | Mucke et al. | 375/295 |
| 5,578,961 | A * | 11/1996 | Fajen et al. | 327/543 |
| 5,752,170 | A | 5/1998 | Clifford | 455/126 |
| 5,752,172 | A | 5/1998 | Matero | 455/127 |
| 5,884,149 | A | 3/1999 | Jaakola | 455/103 |
| 6,009,129 | A | 12/1999 | Kennedy et al. | 375/346 |
| 6,060,950 | A | 5/2000 | Groe | 330/279 |
| 6,084,471 | A | 7/2000 | Ruth, Jr. et al. | 330/254 |
| 6,167,273 | A | 12/2000 | Mandyam | 455/450 |
| 6,178,313 | B1 | 1/2001 | Mages et al. | 455/127 |
| 6,317,589 | B1 | 11/2001 | Nash | 455/245.2 |
| 6,342,804 | B1 * | 1/2002 | Havens et al. | 327/357 |
| 6,370,358 | B1 | 4/2002 | Liimatainen | 455/67.1 |
| 6,788,117 | B1 * | 9/2004 | Roberts | 327/113 |

OTHER PUBLICATIONS

Louis Luh et al., "A Continuous-Time Common-Mode Feedback Circuit (CMFB) for High-Impedance Current Mode Application" IEEE Transactions on Circuits and Systems, Apr. 2000, pp. 363-369.

Jim Karki, "Fully Differential Amplifiers Remove Noise from Common-Mode Signals", www.ednmag.com, Nov. 9, 2000, pp 149-156.

* cited by examiner

*Primary Examiner*—Nguyen T. Vo
(74) *Attorney, Agent, or Firm*—Harrington & Smith, LLP

(57) ABSTRACT

A method is disclosed for operating a radio frequency transmitter chain component, as is a radio frequency transmitter chain component that operates in accordance with the method. The method includes receiving an input signal to be mixed with a signal output from an oscillator, where the input signal is received through an operational amplifier. The method further includes applying an output of the operational amplifier to an input of a mixing circuit, rectifying the input signal to produce a rectified input signal and controlling a common-mode output voltage of the operational amplifier with the rectified input signal. This process varies the power consumption of the component in a manner that is proportional to a value of the input signal. A further step couples a mixer output signal to an input of a VGA. The component may include both the mixer and the VGA. In the preferred embodiment the input signal and the mixer output signal are differential signals.

15 Claims, 3 Drawing Sheets

METHOD AND APPARATUS PROVIDING REDUCTION IN TRANSMITTER CURRENT CONSUMPTION USING SIGNAL DERIVED FROM RECTIFIED INPUT SIGNAL

TECHNICAL FIELD

These teachings relate generally to radio frequency (RF) circuitry and, more specifically, to transmitters of portable radiocommunication terminals, also referred to here in as mobile stations.

BACKGROUND

Referring to FIG. 1, the basic architecture of a conventional RF transmitter chain 1 includes a digital-to-analog converter (DAC) 2, a filter 3, a mixer (up-conversion to the transmitted frequency) 4, a gain control circuit (Variable Gain Amplifier or VGA) 5 and a power amplifier 6 having an output coupled to a transmit antenna 7. The VGA 5 is used to adjust the output power of the transmitter chain 1 to the desired level.

In the conventional transmitter chain 1 the current consumption is typically constant regardless of the value of the input signal, typically represented by In-phase (I) and Quadrature (Q) input signal channels. However, there should be no signal at the transmitter output if the IQ input signal is zero. This condition implies, ideally, that the transmitter current consumption could then also be zero. Prior to this invention, however, it was not possible to adjust the current consumption of the transmitter chain such that only a required amount of current is consumed with each IQ input value.

Said another way, a change in the transmitter bias signal, and hence a change in current consumption, was not possible with prior art transmitter topologies, since the change in the transmitter bias signal would result in an undesirable amplitude modulation of the transmitted carrier signal. More specifically, by changing the current consumption of an amplifier the gain of the amplifier is also changed. Therefore, if one attempted to change the bias to, and hence, the current consumption of the mixer 4, the gain would also change. The change in the amplifier gain resulted in the introduction of the undesirable amplitude modulation of the transmitter output signal.

Reference can be had to the following commonly assigned U.S. Patents for descriptions of various prior art VGA circuits and techniques, used in RF transmitters as well as in RF receivers: U.S. Pat. No. 5,548,616, L. Mucke et al.; U.S. Pat. No. 5,752,172, J. Matero; U.S. Pat. No. 5,752,170, P. Clifford; U.S. Pat. No. 5,884,149, M. Jaakola; U.S. Pat. No. 6,009,129, T. Kenney et al; U.S. Pat. No. 6,060,950, J. Groe; U.S. Pat. No. 6,167,273, G. Mandyam; U.S. Pat. No. 6,084,471, R. Ruth, Jr. et al.; U.S. Pat. No. 6,178,313 B1, P. Mages et al.; U.S. Pat. No. 6,317,589 B1, A. Nash and U.S. Pat. No. 6,370,358 B2, J. Liimatainen.

SUMMARY OF THE INVENTION

The foregoing and other problems are overcome by methods and apparatus in accordance with embodiments of this invention.

In one aspect this invention provides a method for operating a radio frequency transmitter chain component, and a radio frequency transmitter chain component that operates in accordance with the method. The method includes receiving an input signal to be mixed with a signal output from an oscillator, where the input signal is received through an operational amplifier. The method further includes applying an output of the operational amplifier to an input of a mixing circuit, rectifying the input signal to produce a rectified input signal and controlling a common-mode output voltage of the operational amplifier with the rectified input signal in order to vary the power consumption of the component in a manner that is proportional to a value of the input signal. A further step couples a mixer output signal to an input of a VGA. In the preferred, but non-limiting embodiment, the component comprises both the mixer and the VGA. In the preferred embodiment the input signal and the mixer output signal are differential signals.

In a further aspect this invention provides a radio frequency transmitter chain component that includes a mixer for receiving a differential input signal to be mixed with a signal output from an oscillator, where the component includes an input differential operational amplifier for receiving the input signal and for outputting differential signals to a Gilbert cell mixing circuit. The operational amplifier operates with common-mode feedback set by a rectified version of the input signal. The component may further include a VGA having differential inputs coupled to outputs of the Gilbert cell mixing circuit. In the preferred embodiment the input signal comprises one of an Inphase (I) or a Quadrature (Q) analog signal.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

In the prior art transmitter 1 the mixer 4 and the VGA 5 were separate components, and by changing the current consumption of the amplifier the gain of amplifier was also changed. As a result, the gain of the mixer 4 and the VGA 5 would vary if their current consumption were altered.

Figure 2:
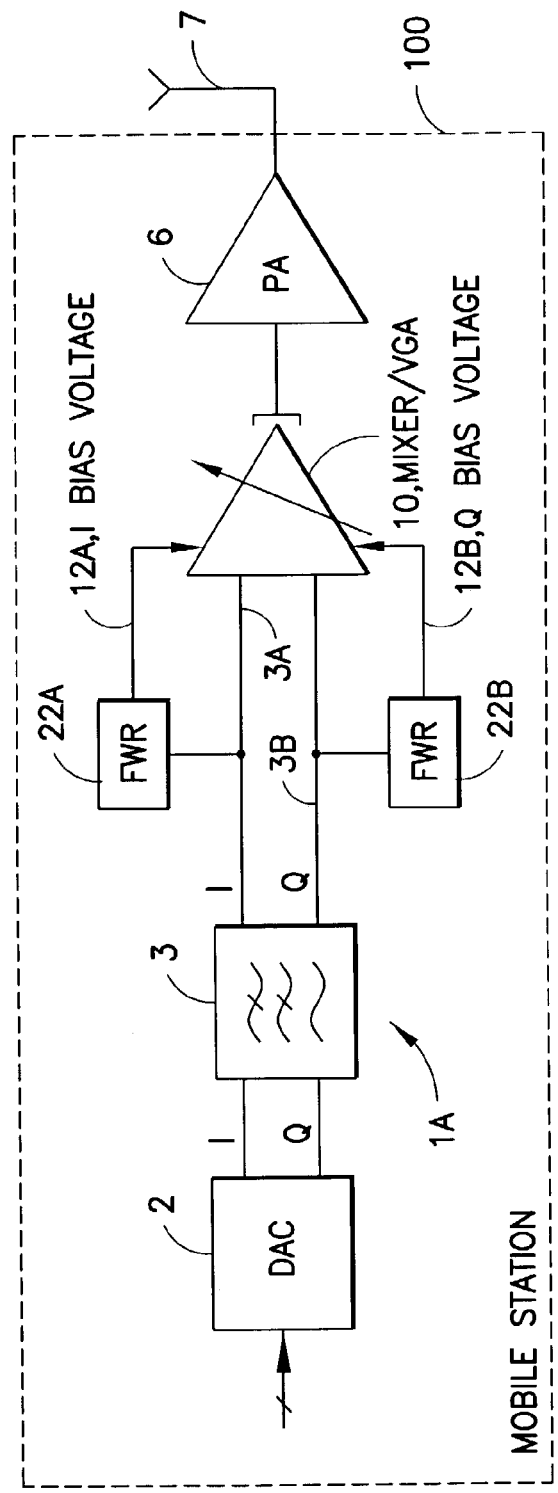
FIG. 2 is a simplified block diagram of an RF transmitter chain having a combined MIXER/VGA circuit in accordance with this invention.

Referring to FIG. 2, in the presently preferred embodiment of this invention the mixer 4 and the VGA 5 are combined into one component, shown as a MIXER/VGA 10, and a change in the current consumption is achieved as a function of the input signal, i.e., the IQ input values to the DAC 2. This results in an improved transmitter chain 1A of a mobile station 100, such as a cellular telephone or a personal communicator, as compared to the convention transmitter chain 1.

Figure 3:
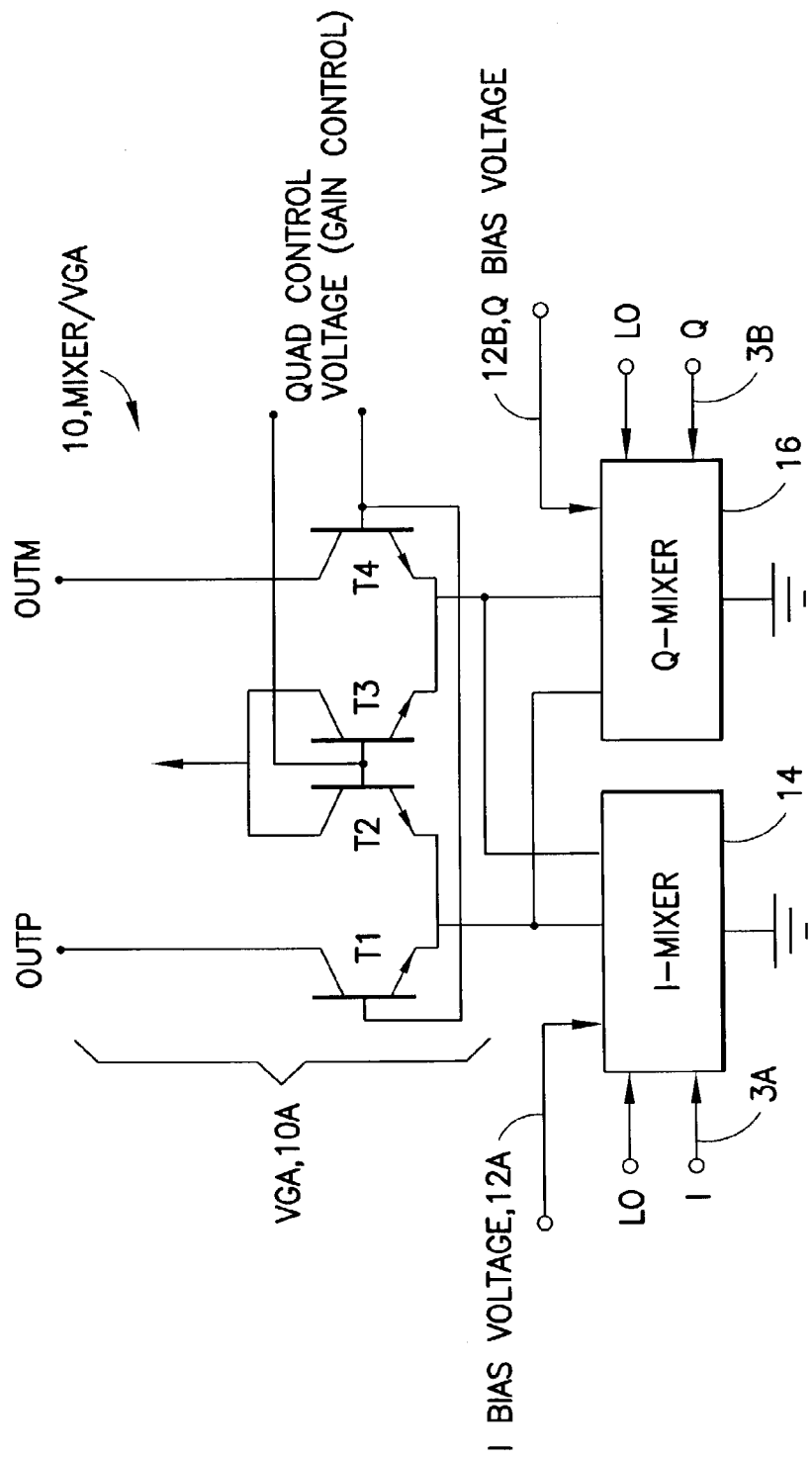
FIG. 3 is a schematic diagram, partly in block diagram form, of the MIXER/VGA circuit shown in FIG. 2.
Figure 4:
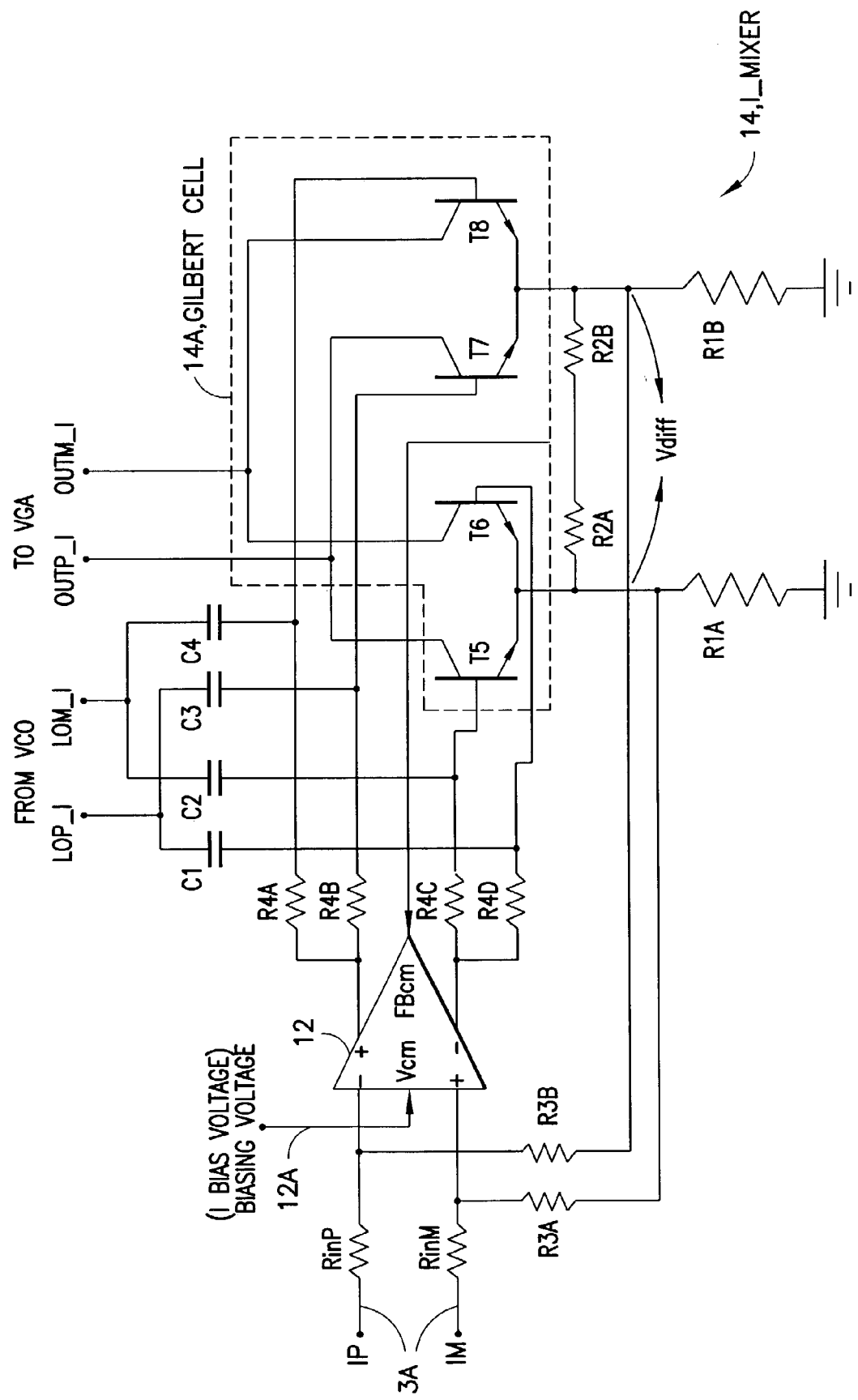
FIG. 4 is a schematic diagram of the I-Mixer block shown in FIG. 3.

Referring also to FIGS. 3 and 4, in the preferred embodiment the current consumption is varied as a result of feedback generated by the inclusion of an operational amplifier (opamp) 12 at the input of the mixer. The presence of the opamp 12 reduces the gain variation of the MIXER/VGA 10, due to a change in bias, by the open-loop gain of the opamp 12. The feedback signal is generated from the output of the opamp 12 where it drives a mixer circuit that, in the presently preferred embodiment, is constructed as a Gilbert cell (see FIG. 4).

In FIG. 2 the DAC 2 generates analog IQ-signals 2A and 2B. The analog IQ signals 2A and 2B are low pass filtered in the filter 3, and fed as filtered analog IQ signals 3A and 3B to the combined MIXER/VGA 10 that both mixes the signal to the higher (carrier) frequency (e.g., about 2 Ghz) and adjusts the output swing, i.e., controls the gain of the modulated carrier signal. The gain controlled carrier signal is then fed to the power amplifier 6, which feeds the signal to the antenna 7 with constant gain. As examples, in a wideband code division, multiple access (WCDMA) embodiment the bandwidth of the analog IQ signals 3A and 3B is approximately 2.5 MHz, while in a GSM embodiment the bandwidth is approximately 150 kHz.

FIG. 3 shows the MIXER/VGA 10 to be constructed of an I-Mixer 14 and a Q-Mixer 16 having outputs that feed a transistor quad 18 (transistors T1, T2, T3 and T4). A quad control voltage controls the gain of the quad 18, and thus the gain of the VGA portion 10A of the MIXER/VGA 10. The quad 18 is composed of bipolar junction transistor (bjt) differential pairs and forms the gain control element of the VGA 10A. The quad control voltage (gain control) is typically applied from a control device, such as a DSP, through a temperature compensation block (not shown), and causes the gain of the VGA 10A to change. Current is steered between the bipolar junction transistors (bjts) of the quad 5A according to the quad (gain) control voltage.

FIG. 4 shows a schematic diagram of the I-Mixer 14 of FIG. 3, it being realized that the Q-Mixer 16 is identically constructed, although the signal designations are changed (e.g., IP=QP, IM=QM, LOP_I=LOP_Q, etc.). In FIG. 4 the signals LOP_I and LOM_I are input signals from a local oscillator (LO), typically a voltage controlled oscillator (VCO, not shown), and represent the frequency signals to be mixed with IP and IM.

The gain of the PA 6 is typically about 20 dB to 40 dB, and the required output power is typically in excess of 20 dBm. As a result, the required output power from the MIXER/VGA 10 is about 0 dB.

In accordance with this invention the varying I and Q voltages 3A and 3B are rectified to DC, preferably by full-wave rectifiers (FWRs) 22A and 22B shown in FIG. 2. The resulting rectified I and Q voltages 12A and 12B, respectively, are applied to the MIXER/VGA 10 and are used for biasing the I-Mixer 14 and the Q-Mixer 16, respectively. More specifically, and referring to the I-Mixer 14, the rectified I voltage 12A is applied as a biasing voltage to the opamp 12, which also receives the input IP and IM signals 3A from the filter 3. The opamp 12 receives the biasing voltage 12A as a common-mode target voltage ($V_{cm}$) and adjusts its output so that the $FB_{cm}$ (common-mode feedback) input voltage is equal to the biasing voltage. The result is that the current consumption of the I-mixer 14 is given by the expression: (Biasing_Voltage*2)/R1. The current difference for the mixer Gilbert cell 14A (transistors T5–T8) is, however, controlled by the differential input signal IP-IM output from the opamp 12, via resistors R4A–R4D. It can thus be appreciated that the change in the bias does not alter the output of the I-Mixer 18. As the value of the input I channel signal decreases the magnitude of the biasing voltage 12A also decreases, which in turn reduces Vcm and thus reduces the current consumption of the I-Mixer 14, which is the desired result.

Such common-mode feedback (CMFB) techniques can be used to stabilize common-mode voltages for fully differential analog systems by way of adjusting the common-mode output currents. A fully differential amplifier, as in the case of the opamp 12, offers the opportunity to control the output common-mode voltage independently of the differential voltage. The purpose of the $V_{cm}$ input is to set the output common-mode voltage. In a typical case the output common-mode voltage can be set at a value that is mid-rail, i.e., mid-way between the two power supplies of the opamp. In general, the voltage difference between the (+) and (−) inputs of the opamp 12 is the input differential voltage $V_{ID}$. The average of the two input voltages is the input common-mode voltage $V_{IC}$. The difference between the voltages at the (+) and (−) outputs of the opamp 12 is the output differential voltage $V_{OD}$. The output common-mode voltage $V_{OC}$, expressed as FBcm in the case of the opamp 12, is the average of the two voltages at the (+) and (−) outputs of the opamp 12, and is controlled by the voltage (biasing voltage 12A) applied to the $V_{cm}$ input. The above-mentioned opamp feedback path can be seen to be established to the opamp $FB_{cm}$ input via resistors R2A and R2B, which are tied between the emitters of the Gilbert cell transistors T5, T6 and T7, T8.

As was noted above, the $FB_{cm}$ input node of the opamp 12 is used in conjunction with the $V_{cm}$ input node. The opamp 12 operates so as to change the common mode voltage of the outputs OUTP and OUTM (of the Gilbert cell 14A) such that the $FB_{cm}$ node voltage equals the $V_{cm}$ target (biasing) voltage. Approximate resistor values may be, as examples only, R1<100 Ohms, R2>20 kOhms, R3=Rinp=Rinm<20 kOhms, R4>1 kOhms, assuming opamp 12 supply voltages in the range of, for example, zero volts to five volts (or less). The voltage difference ($V_{diff}$) between the top nodes of resistors R1A and R1B (i.e., the nodes that are also connected to the emitters of T5,T6 and T7,T8, and to feedback resistors R2A and R2B) can be represented by $V_{diff}$=(R3/RIN)*VIN. If the resistors are valued such that R3A=R3B=Rinp=Rinm, then the voltage difference between IM and IP is transferred to the emitters of T5,T6 and T7,T8.

The current of the MIXER/VGA 10 can be significantly reduced through the use of this invention. It should be noted, however, that this invention can be used to reduce the current consumption in other circuit blocks as well, such as in the PA 6, so long as the block is not sensitive to amplitude modulation.

Figure 1:
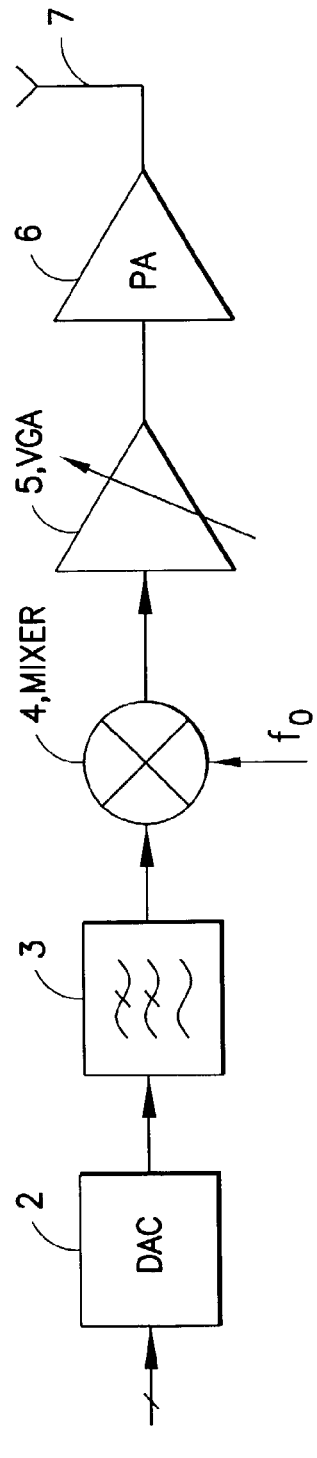
FIG. 1 is a simplified block diagram of a conventional RF transmitter chain.

In accordance with this invention, the current consumption of the MIXER/VGA 10 is controlled with the input signal (the I or Q signal, depending on whether one is considering the I-Mixer 14 or the Q-Mixer 16). The resulting reduction in current can exceed, for example, 30%. This change in bias has not been possible to achieve with the conventional transmitter topologies, such as the one shown in FIG. 1, since the change in bias results in amplitude modulation of the transmitted signal. However, by using the single stage MIXER/VGA 10 the biasing is accomplished using the input opamp 12 and, therefore, all of the undesirable parasitic effects that might arise from the change in bias are divided by the gain of the opamp 12. The gain of the transmitter chain 1A can thus be made linear, and current consumption can be beneficially reduced when operating with lower input signals.

The foregoing embodiments should be viewed as being exemplary of this invention, and not as imposing limitations upon the practice of this invention. For example, the various component values, component interconnections, signal bandwidths, frequencies and the like are all provided as examples, and are not to be read or construed in a limiting sense. Also by example, while the invention has been described in the context of circuitry having differential inputs and outputs, those skilled in the art should appreciate that at least certain aspects of this invention can be applied as well to non-differential, single ended circuitry. Furthermore, and as was noted, the use of this invention is not limited to reducing current consumption in only the transmitter mixer/VGA.

Thus, while these teachings have been particularly shown and described with respect to preferred embodiments thereof, it will be understood by those skilled in the art that changes in form and details may be made therein without departing from the scope and spirit of these teachings.

What is claimed is:

1. A radio frequency transmitter chain component, comprising a mixer for receiving an input signal to be mixed with a signal output from an oscillator, said mixer comprising an input operational amplifier for receiving said input signal and for outputting a signal to a mixing circuit, said operational amplifier operating with common-mode feedback set by a rectified version of said input signal.

2. A radio frequency RF transmitter chain component as in claim 1, where said mixer has an output for coupling a mixer output signal to an input of a variable gain amplifier (VGA).

3. A radio frequency transmitter chain component as in claim 2, where said component comprises both said mixer and said VGA.

4. A radio frequency RF transmitter chain component as in claim 1, where said common-mode feedback varies the power consumption of said component in a manner that is proportional to a value of said input signal.

5. A radio frequency RF transmitter chain component as in claim 2, where said input signal and said mixer output signal are differential signals.

6. A radio frequency transmitter chain component, comprising:
   a mixer for receiving a differential input signal to be mixed with a signal output from an oscillator, said mixer comprising an input differential operational amplifier for receiving said input signal and for outputting differential signals to a Gilbert cell mixing circuit, said operational amplifier operating with common-mode feedback set by a rectified version of said input signal; and
   a variable gain amplifier (VGA) having differential inputs coupled to outputs of said Gilbert cell mixing circuit.

7. A radio frequency RF transmitter chain component as in claim 6, where said common-mode feedback varies the power consumption of said component in a manner that is proportional to a value of said input signal.

8. A radio frequency RF transmitter chain component as in claim 6, where said input signal comprises one of an Inphase (I) or a Quadrature (Q) analog signal.

9. A method for operating a radio frequency transmitter chain component, comprising:
   receiving an input signal to be mixed with a signal output from an oscillator, said input signal being received through an operational amplifier;
   applying an output of said operational amplifier to an input of a mixing circuit;
   rectifying said input signal to produce a rectified input signal; and
   controlling a common-mode output voltage of said operational amplifier with said rectified input signal in order to vary the power consumption of said component in a manner that is proportional to a value of said input signal.

10. A method as in claim 9, further comprising coupling a mixer output signal to an input of a variable gain amplifier (VGA).

11. A method as in claim 10, where said component comprises both said mixer and said VGA.

12. A method as in claim 10, where said input signal and said mixer output signal are differential signals.

13. A mobile station comprising a transmitter chain, said transmitter chain comprising a mixer coupled between a filter and a variable gain amplifier (VGA), said mixer comprising a mixing circuit for receiving a differential input signal to be mixed with a signal output from an oscillator, characterized in that said mobile station comprises a rectifier for rectifying said differential input signal and an input differential operational amplifier for receiving the differential input signal and for outputting an output differential signal to said mixing circuit, said differential operational amplifier further comprising a first input node coupled to an output of said rectifier for receiving a target common mode bias signal therefrom, said differential operational amplifier controlling the output differential output to the mixer circuit such that a common-mode feedback input signal received at a second input node is made equal to the target common mode bias signal.

14. A mobile station as in claim 13, where said mixer circuit comprises a Gilbert cell, and where said VGA comprises differential inputs coupled to differential outputs of said Gilbert cell.

15. A mobile station as in claim 14, where said differential operational amplifier reduces gain variation of the mixer circuit and VGA, due to a change in value of the target common mode bias signal, by the open-loop gain of the differential operational amplifier.

* * * * *